(No Model.)

A. ENGI.
CHEESE TURNER.

No. 254,294. Patented Feb. 28, 1882.

Witnesses
Frank Thomason
Adolph Lotz
F. W. Kaschagen

Inventor:
Andreas Engi
By Wm H Lotz
Attorney

UNITED STATES PATENT OFFICE.

ANDREAS ENGI, OF NEW GLARUS, WISCONSIN.

CHEESE-TURNER.

SPECIFICATION forming part of Letters Patent No. 254,294, dated February 28, 1882.

Application filed September 29, 1881. (No model.)

*To all whom it may concern:*

Be it known that I, ANDREAS ENGI, of New Glarus, in the county of Green and State of Wisconsin, have invented a certain new and useful Improvement in Cheese-Turners; and I do hereby declare that the following is a full, clear, and exact description thereof, reference being had to the accompanying drawings, and to the letters of reference marked thereon, which form a part of this specification.

This invention relates to apparatus for the manufacture of cheese, and more particularly for making the so-called "Limburg cheese," which is peculiar for its strong flavor. The difference in the manufacture of this cheese is that the curds are not pressed for separating the whey, but only the surplus whey is discharged therefrom by filtering or draining.

My invention consists of a tray in which the curds are held in suspense between two hurdles that are covered with wire-cloth, so as to drain the curds of their surplus whey, and which hurdles are removably secured between two pivots to enable their frequent reversing, all as more fully hereinafter described and specifically claimed.

Figure 1:
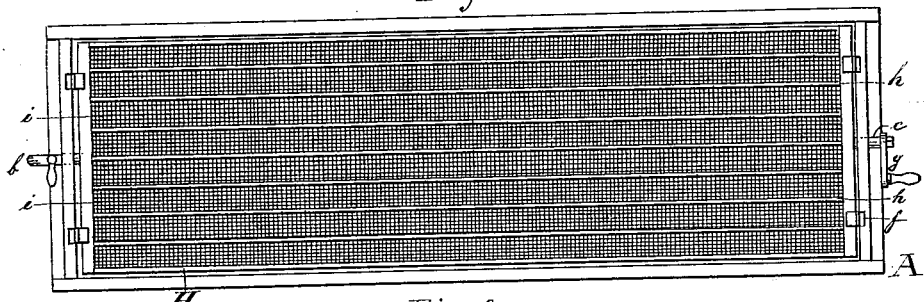
Figure 2:
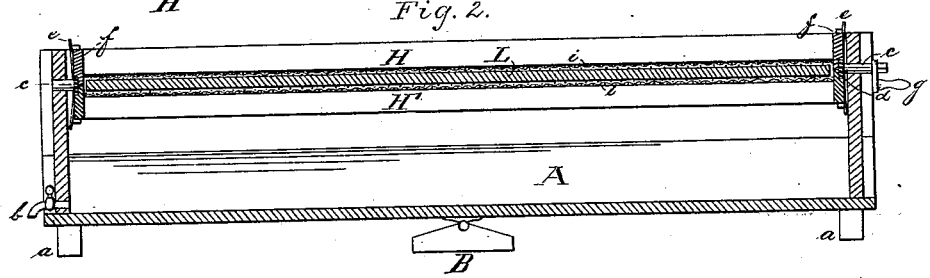
Figure 3:
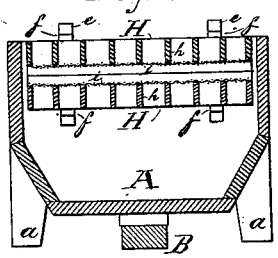
Figure 4:
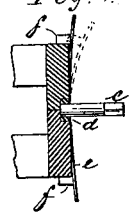
Figure 5:
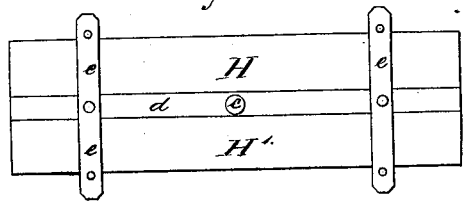
Figure 6:
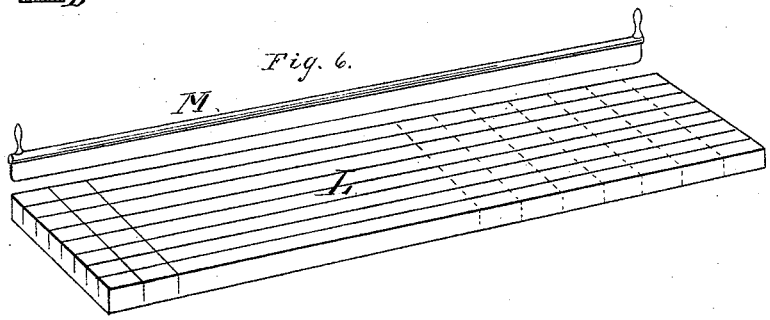

In the accompanying drawings, Figure 1 represents a plan view of my apparatus; Fig. 2, a longitudinal vertical section through the center of the same; Fig. 3, a vertical cross-section; Fig. 4, a detached sectional view of one of the pivots for holding the hurdles. Fig. 5 shows an end view of the pivotal hurdle-holding device, and Fig. 6 the cheese when ready and the knife that cuts the cheese into bricks of equal size.

Like letters represent corresponding parts in all the figures.

A denotes a wooden tray, which may be lined on its inside with sheet metal. This tray has four feet, $a$, and at its middle it is pivotally supported and balanced upon block B, so as to permit a slight inclination in either direction. A faucet, $b$, is secured near the bottom in one end of said tray.

Through the horizontal center of each end of tray A, and near the top of the same, is pivoted a trunnion, $c$, which at one end is rigid with a bar, $d$. Upon said bar, near the ends of the same, are secured transversely two flat springs, $e$, that have lugs $f$ to their extremities. One of the trunnions $c$ is sufficiently elongated for attaching a crank, $g$, to its projecting end.

H H' are two hurdles, each consisting of a rectangular frame, having longitudinal parallel bars $h$ secured between the end bars at equal distance apart, and upon one side of which frame is stretched a sheet of wire-cloth, $i$. These hurdles H H' are removably suspended between the two bars $d$ by springs $e$ and lugs $f$, with their wire-cloth-lined faces inward or toward each other.

For making cheese, one of the hurdles, H, is removed by first retracting the springs $e$, when upon the wire-cloth of the remaining hurdle the curds are spread at the proper uniform thickness. Now the hurdle that had been removed is placed over the curds, and is secured in its position by the lugs $f$ of springs $e$. The curds thus held between the wire-cloth of the two hurdles will be drained of their surplus whey, that will trickle down; and during the process of solidifying of the cheese the hurdles are frequently reversed by the crank $g$, so as to drain and dry it uniformly from both sides. After the cheese L has sufficiently hardened it is cut first longitudinally into strips with a long knife, M, and then by cutting these strips transversely with a shorter knife pieces are formed of a brick shape, which are wrapped in paper and tin-foil, are labeled, and are then ready for the market. The whey drained off the curds will collect in the bottom of tray A, whence it is discharged through the faucet $b$ by inclining said tray upon the central or balance block, B.

What I claim is—

1. In combination with the tray A, having block B, the hurdles H H', pivotal bars $d$, springs $e$, and lugs $f$, all substantially as and for the purpose set forth.

2. The tray A, having bars $d$ and trunnions $c$, the springs $e$, having lugs $f$, and crank $g$, in combination with the hurdles H H', having longitudinal bars $h$, and wire-cloth covering $i$, all substantially as and for the purpose set forth.

In testimony that I claim the foregoing as my invention I affix my signature in presence of two witnesses.

ANDREAS ENGI.

Witnesses:
F. W. KASEHAGEN,
F. Y. ADAMS.